United States Patent [19]
Conradsson et al.

[11] Patent Number: 5,934,763
[45] Date of Patent: Aug. 10, 1999

[54] METHOD FOR MOUNTING OF A BEARING IN A WHEEL HUB, AND A WHEEL MANUFACTURED BY THE METHOD

[75] Inventors: Bo Conradsson; Ake Conradsson, both of Bredaryd, Sweden

[73] Assignee: Industriverktyg AB, Bredaryd, Sweden

[21] Appl. No.: 08/776,155

[22] PCT Filed: Jul. 25, 1995

[86] PCT No.: PCT/SE95/00884

§ 371 Date: Feb. 24, 1997

§ 102(e) Date: Feb. 24, 1997

[87] PCT Pub. No.: WO96/03288

PCT Pub. Date: Feb. 8, 1996

[30] Foreign Application Priority Data

Jul. 25, 1994 [SE] Sweden .................................. 9402565

[51] Int. Cl.⁶ .................................................. B60B 5/02
[52] U.S. Cl. ...................... 301/64.3; 301/64.7; 264/274
[58] Field of Search .................... 301/5.7, 64.2, 301/64.3, 64.7, 105.1, 110.5; 264/273, 274; 29/894.32

[56] References Cited

U.S. PATENT DOCUMENTS

| | | | |
|---|---|---|---|
| 2,955,884 | 10/1960 | Marshall | 301/64.7 X |
| 3,227,000 | 1/1966 | Gits | 264/274 X |
| 3,578,812 | 5/1971 | Taussig et al. | |
| 3,894,776 | 7/1975 | Black | |
| 3,990,136 | 11/1976 | Hishida | 264/274 X |
| 4,072,373 | 2/1978 | Black | 301/5.7 X |
| 4,295,256 | 10/1981 | Pascal | 264/274 X |
| 4,818,034 | 4/1989 | Djerf | 301/64.7 |

FOREIGN PATENT DOCUMENTS

| | | |
|---|---|---|
| 0 368 480 | 5/1990 | European Pat. Off. . |
| 1177294 | 1/1970 | United Kingdom . |
| 1240377 | 7/1971 | United Kingdom . |
| 1603178 | 11/1981 | United Kingdom . |

*Primary Examiner*—Russell D. Stormer
*Attorney, Agent, or Firm*—Young & Thompson

[57] ABSTRACT

A method for mounting a bearing in a wheel hub, and a wheel manufactured by the method, wherein a wheel body is placed in a mold with a tubular-shaped bearing placed in a hub part of the wheel body, annular tread is die cast around the outer periphery of the wheel body, preferably at the same time as the bearing is fixed in the hub part of the wheel body by a die casting at least partly surrounding the bearing. The hub part in the wheel comprises axially separated, annular arranged support members having at least one axial opening and engaging radially a casing part of the bearing. The bearing is thereby axially fixed by a die cast, elastic plastic material in a space between the outer casing part and an inner wall surface of the hub part.

10 Claims, 2 Drawing Sheets

METHOD FOR MOUNTING OF A BEARING IN A WHEEL HUB, AND A WHEEL MANUFACTURED BY THE METHOD

BACKGROUND OF THE INVENTION

The present invention concerns partly a method for mounting of a tubular-shaped bearing in a hub part of a wheel, the bearing having an elongated cylindrical casing part, which is shaped to be radially supported by axially separated, annular arranged support members in the wheel's hub part, and partly a wheel comprising a wheel body with a hub part, which contains a cylindrical, tubular-shaped bearing.

DESCRIPTION OF THE RELATED ART

During the manufacturing of wheels for cars, light freight vehicles and the like, for example wheels for shopping trolleys which are normally found in shops and supermarkets, various separate sub-operations are required for the manufacturing of the wheel body itself, the molding and the fastening of a tread as well as the mounting and the attachment of wheel bearings.

SUMMARY OF THE INVENTION

A general purpose of the present invention is to achieve a simplification in, and a reduction of the cost of, manufacturing such a wheel.

In its broadest sense, this is achieved according to the invention by axially fixing the bearing in the hub part by introducing an elastic plastic material, via at least one axial opening in at least one of the annular support members, into a space defined by the casing part and an inner wall surface of the hub part between the axially separated support members. An annular flange element can also be shaped around the casing part axially outside the annular support members. In this way an extremely good axial fixing of the bearing is achieved.

Preferably, the wheel body in this method has two complimentary wheel halves and a tubular-shaped bearing placed in a hub part jointly formed by the wheel halves, where the bearing has an elongated cylindrical casing part with parts shaped to be radially supported by axially separated, annular support members arranged in the wheel's hub part, wherein the method comprises the steps of jointly fixing the wheel's hub part by axially-fixing the bearing in the hub part by means of an elastic plastic material, which is introduced, via at least one axial opening in at least one of the annular support members, into a space defined by the casing part and an inner wall surface of the hub part between the axially separated support members, and preferably simultaneously die casting around the outer periphery of the wheel halves an annular tread holding the wheel halves' peripheries together.

Preferably, the molding of the tread and the attachment of the bearing is accomplished with the same kind of material. The moldings material used can be made of an elastic plastic material, such as an elastomer, which can be a synthetic rubber, for example polyurethane rubber or the like.

The wheel according to the invention is characterized in that the hub part comprises axially separated, annular arranged support members having at least one opening and engaging radially a casing part of the bearing, and that the bearing is axially fixed in the hub part by a die cast, elastic plastic material in a space defined by the casing part and an inner wall surface of the hub part.

BRIEF DESCRIPTION OF THE DRAWINGS

Further details and features of the invention will become evident below with reference to the attached drawings, in which.

DESCRIPTION OF THE PREFERRED EMBODIMENT

Figure 1:
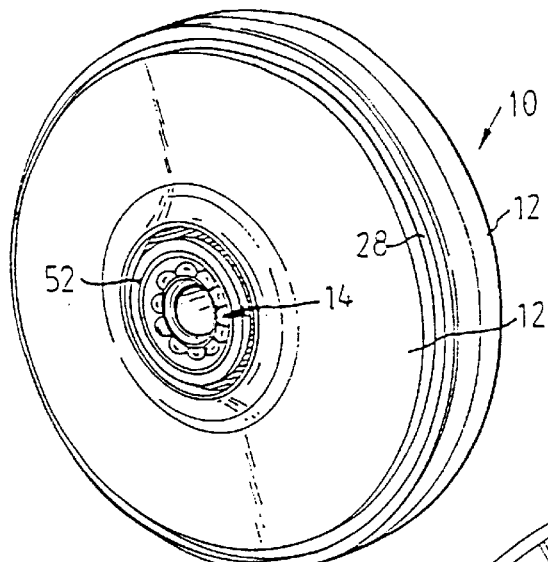
FIG. 1 is a perspective view of a wheel composed of two wheel halves having a tubular bearing placed therein.
Figure 3:
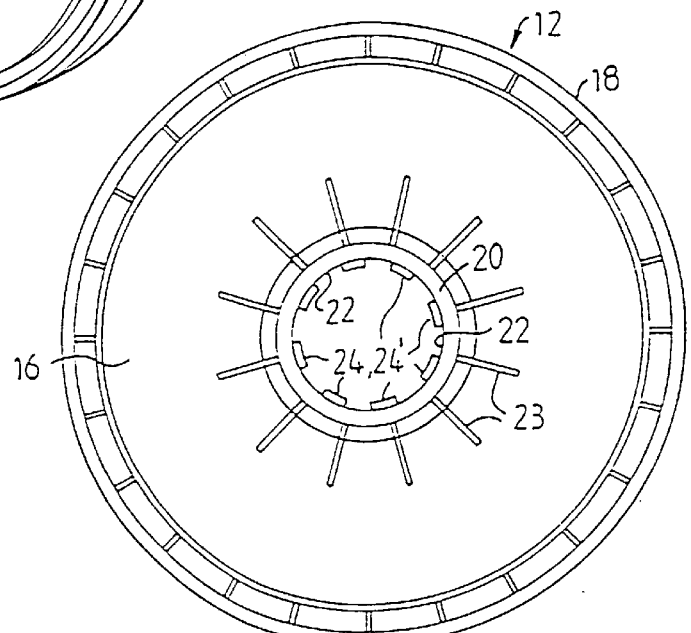
FIG. 3 is a side elevation of the wheel half from FIG. 2 seen from the inside.
Figure 2:
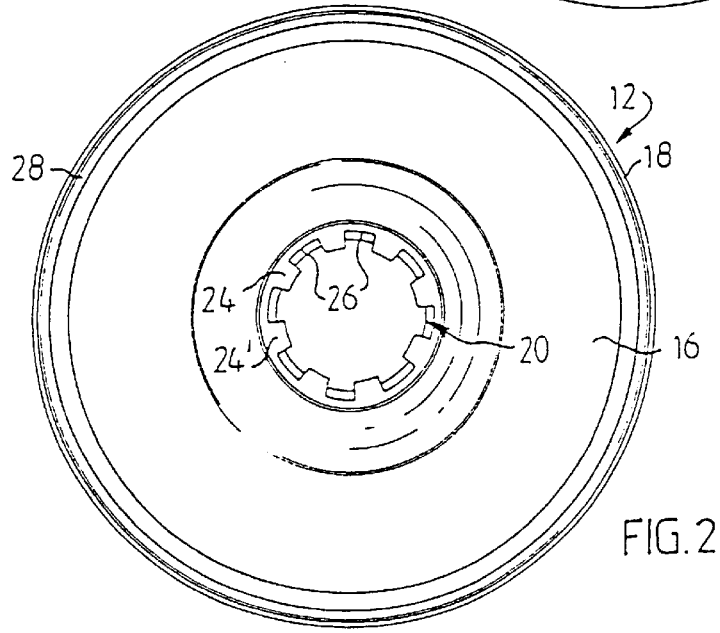
FIG. 2 is a side elevation of one wheel half seen from the outside.

FIG. 1 shows a wheel generally denoted 10, which is made of two preferably identical, complimentary wheel halves 12 (FIGS. 2 and 3), and a single tubular-shaped bearing 14 in the hub section of the wheel 10. The wheel halves 12 have a disc shaped radial part 16 with an outer peripheral part 18 and an inner hub part 20 and are preferably formed of a thermosetting plastic or another material which is shape stable after being formed. Each hub part 20 comprises a cylindrical inner wall surface 22 with radial support flanges 23 (FIG. 3) and an annular support member situated axially externally thereof for radial support of the tubular bearing 14. In the shown embodiment, the annular support member has the shape of a ring 24 extending radially inwardly relative to the cylindrical inner wall surface 22 and in which a number of recesses 26 are distributed around the circumference, thereby forming a number of annular arranged radial support bosses 24' for the tubular bearing 14. The peripheral part 18 of each wheel half 12 has a circumferential groove 28 which forms an anchoring groove for a tread 30 (FIG. 4), such as is more closely described below.

Figure 5:
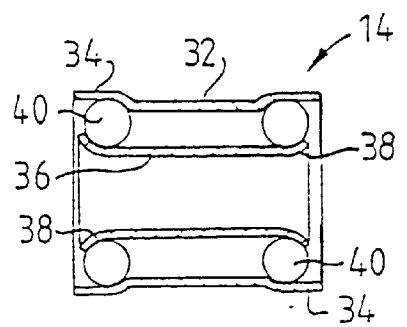
FIG. 5 is a longitudinal section through the tubular-bearing of the wheel.

As shown in FIG. 5, the type of bearing 14, which is used in the wheel 10 according to the invention, is a tubular-shaped roller bearing, which comprises an outer, elongated cylindrical bearing casing 32 having two outer bearing races 34 situated at the ends, and an inner cylindrical bearing casing 36 having inner bearing races 38 at the ends, a respective row of ball shaped bearing bodies 40 being disposed in between the outer and inner bearing races 32, 38. The outer diameter (at 34) of the outer bearing casing 32 substantially corresponds to the inner diameter of the annular support members 24, 24' of the wheel hub.

During the manufacture of a wheel 10 according to the invention the wheel halves 12 are first die cast in a separate mold (not shown) wherein, for example, a thermosetting plastic is used so that the wheel halves 12 will become light, strong and shape stable. Then, two wheel halves 12 are laid mirror inverted towards each other in a molding tool generally denoted 42 (see FIG. 4) which comprises two mold halves 44, 46. A tubular bearing 14 is held centrally placed in the hub jointly formed by the wheel halves 12 by means of a fixture 48, so that the bearing's outer bearing races 34 are held in a position opposite to the radial support members 24, 24' in the wheel hub. In a subsequent operation a die casting material 60 is injected into a mold cavity defined by the wheel's peripheral part 18 and the mold halves 44, 46 to form a tread 30 joining the wheel halves 12, and into a space 50 defined by the inner wall surface 22 in the hub part 20 and the outside of the outer casing part 32 of the bearing 14, via cuts or axial openings 26 in the ring-shaped support member 24.

Figure 4:
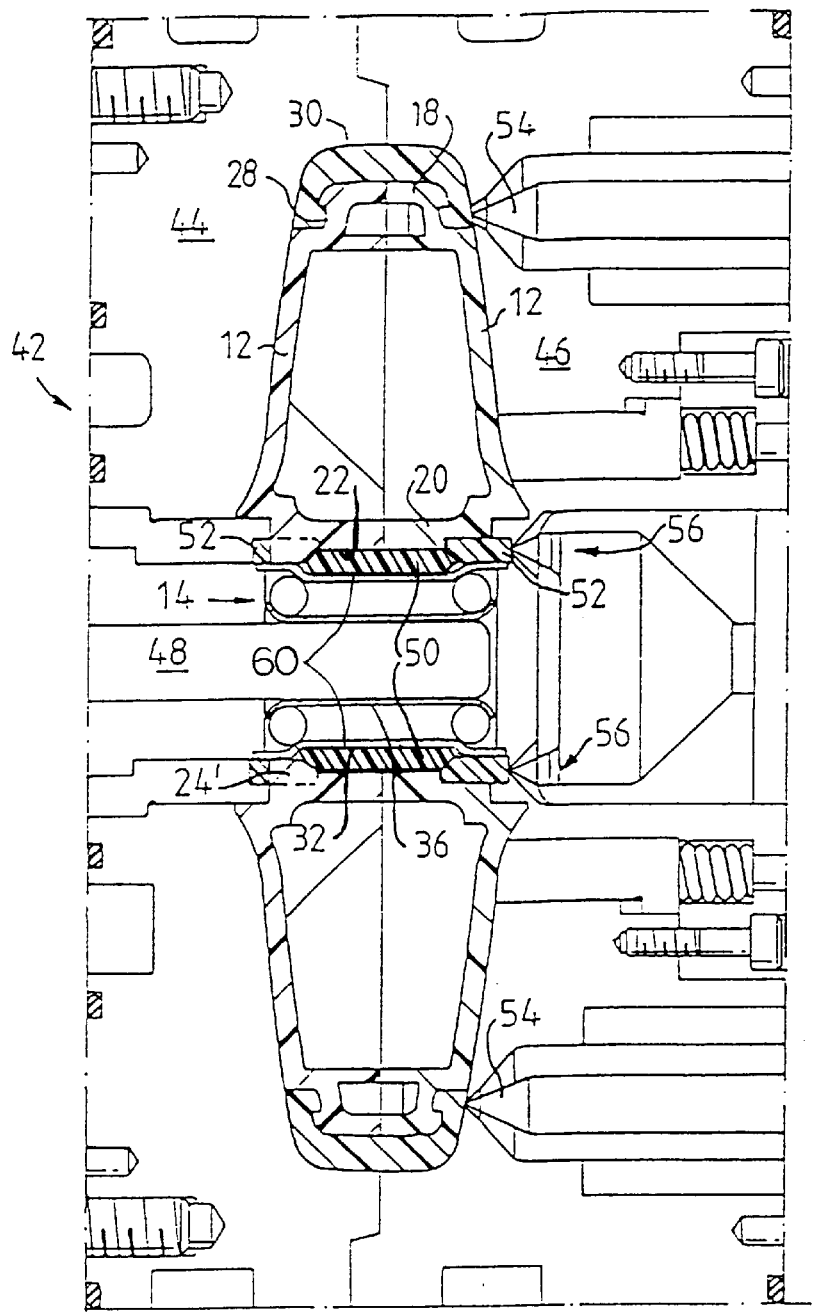
FIG. 4 is a cross-section through a molding tool in which two complimentary, identical wheel halves are placed with a tubular bearing mounted in the hub section.

Simultaneously, ring flanges 52 are also formed axially outside the support bosses 24', as shown in FIGS. 1 and 4 thereby forming flanges 52 and the axial bearing attachment in space 50 at the same time with the same material. The injection of the molding material for the molding of the tread and the axial bearing attachment takes place at circumferentially separated spots both for the molding of the tread 30 and for the bearing attachment, as is shown by nozzles 54 and 56 respectively in FIG. 4.

During the assembly of wheel halves 12 in the molding tool 42 the radial support bosses 24' of the wheel halves 12 can be so displaced in the circumferential direction relative to each other that the support bosses 24' in one wheel half axially confront an axial opening 26 in the other wheel half, such as indicated in FIG. 4. In this manner the strength of the axial attachment of the bearing 14 in the hub 20 can be improved by means of the cast material.

An elastic plastic material, for example an elastomer such as polyurethane rubber or similar material, is preferably used as the molding material for the tread 30 and the axial bearing attachment. The molding of tread 30 and the axial bearing attachment is preferably performed at the same time and with the same material. It is however possible within the scope of the invention to use different materials for the tread 30 and the bearing attachment and to perform the molding of these at different times, even if this is a less satisfactory alternative. It is likewise possible that instead of using hollow complimentary wheel halves 12 to use a single solid wheel body.

By means of the method according to the invention it is therefore possible during the manufacture of a wheel in the one and same operation to form on the one hand a tread, which joins together the wheel's two wheel halves, and on the other hand to fix an elongated cylindrical tubular bearing in the wheel hub with the one and same elastic material.

We claim:

1. A method for manufacturing a bearing-equipped wheel, comprising the steps of:

providing two complimentary wheel halves, each of the two complimentary wheel halves comprising an outer periphery;

providing a bearing assembly comprising an elongated cylindrical casing part and parts shaped to be radially supported;

providing a hub part comprising axially separated, annular support members, the axially separated, annular support members arranged in the hub part of the wheel to radially support the parts shaped to be radially supported of the elongated cylindrical casing, and an inner wall surface located between the axially separated, annular support members, at least one of the annular support members comprising an axial opening;

placing the wheel halves, the hub part, and the bearing assembly within a mold so that a space is defined between the elongated cylindrical casing part and the inner wall surface of the hub part between the axially separate, annular support members;

axially fixing the bearing in the hub part of the wheel by introducing an elastic plastic material, via the at least one axial opening, into the space defined between the elongated cylindrical casing part and the inner wall surface of the hub; and die casting around the outer periphery of the wheel halves an annular-shaped tread holding the peripheries of the wheel halves together.

2. The method of claim 1, wherein the step of axially fixing the bearing in the hub part of the wheel by introducing an elastic plastic material and the step of die casting around the outer periphery of the wheel halves an annular-shaped tread steps are performed simultaneously.

3. The method of claim 1, wherein the step of axially fixing the bearing in the hub part of the wheel by introducing an elastic plastic material, further comprises the step of introducing additional elastic plastic material to form, axially outside the annular support members, an annular flange element around the elongated cylindrical casing part.

4. The method of claim 1, wherein the step of axially fixing the bearing in the hub part of the wheel by introducing an elastic plastic material, and the step of die casting around the outer periphery of the wheel halves an annular-shaped tread utilizes the same kind of material.

5. The method of claim 1, wherein the elastic plastic material is made of an elastomer.

6. The method of claim 5, wherein the elastomer is a synthetic rubber.

7. The method of claim 6, wherein the synthetic rubber is polyurethane rubber.

8. A wheel for carts, vehicles or the like, comprising:

a wheel body comprising a hub part;

a cylindrical, tubular-shaped bearing comprising a casing part;

said hub part comprising an inner wall surface and axially separated, annular arranged support members, at least one of said support members comprising an axial opening;

said support members engaging radially said casing part, wherein said cylindrical, tubular-shaped bearing is axially fixed to said hub part by a die cast, elastic plastic material in a space defined by said casing part and said inner wall surface of said hub part, each of said axially separated radial support members are radially inwardly directed, said axially separated radial support members comprise a ring flange, and said ring flange comprises a plurality of axial openings distributed around a circumference.

9. A wheel for carts, vehicles or the like, comprising:

a wheel body comprising a hub part;

a cylindrical, tubular-shaped bearing comprising a casing part;

said hub part comprising an inner wall surface and axially separated, annular arranged support members, at least one of said support members comprising an axial opening;

said support members engaging radially said casing part, wherein said cylindrical, tubular-shaped bearing is axially fixed to said hub part by a die cast, elastic plastic material in a space defined by said casing part and said inner wall surface of said hub part, wherein said wheel body comprises two complimentary wheel halves with outer peripheral parts, said hub part being formed by portions of said complimentary wheel halves, said portions of said wheel halves forming said hub part being axially joined by the elastic plastic material, said outer peripheral parts of said wheel halves being joined by a tread of a plastic material.

10. The wheel of claim 9, wherein the elastic plastic material and the plastic material are the same material.

\* \* \* \* \*